No. 850,000. PATENTED APR. 9, 1907.
J. P. HOLDER.
CUSHION WHEEL.
APPLICATION FILED FEB. 24, 1906.
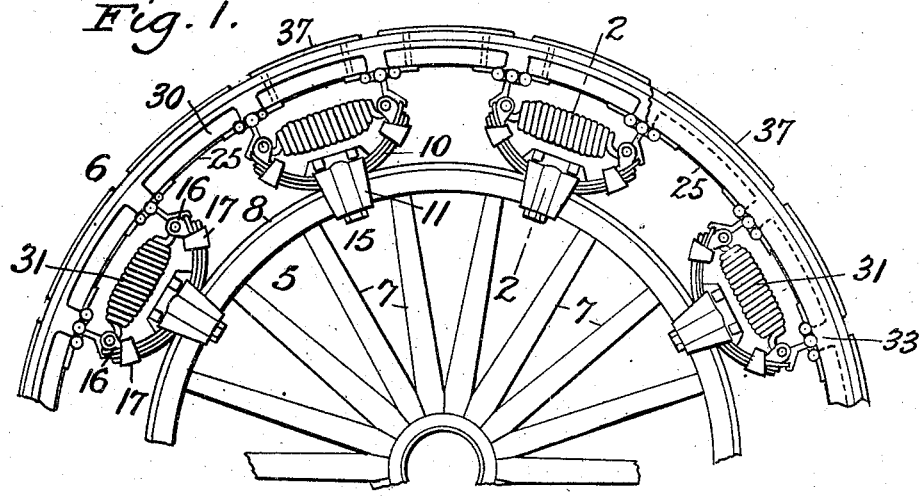
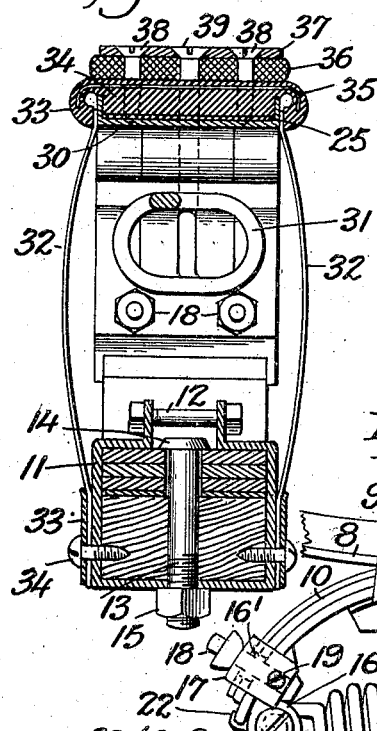
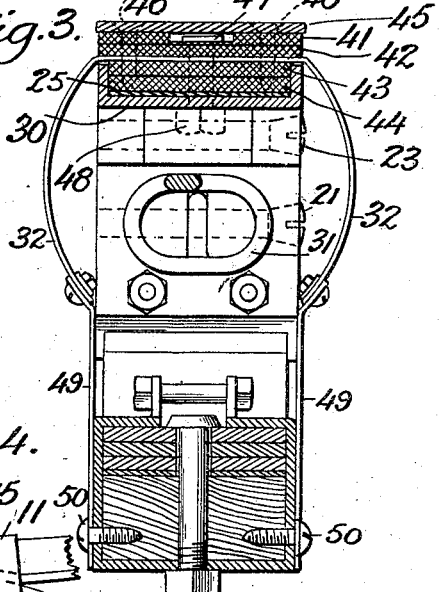
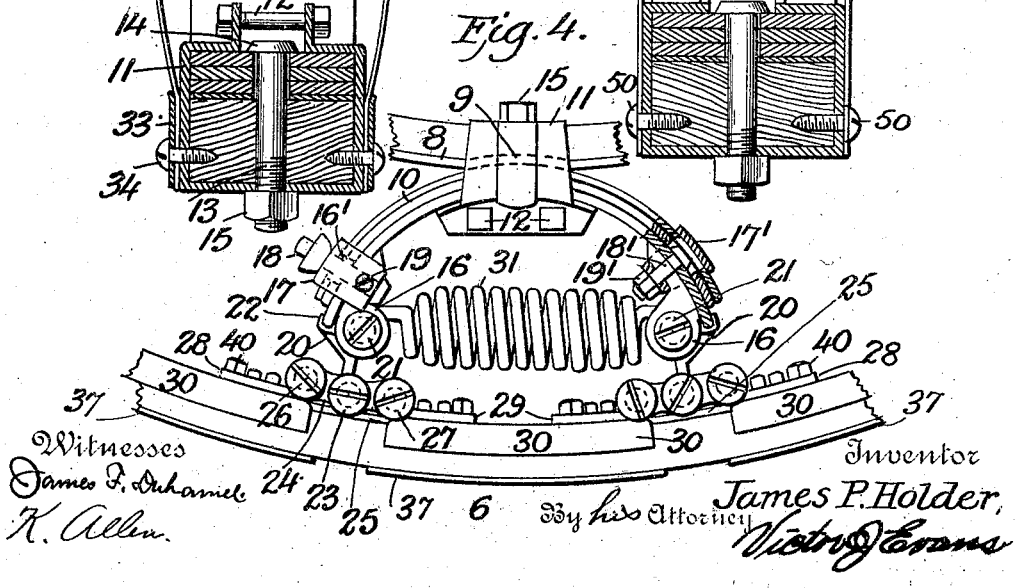
Witnesses
James P. Duhamel
K. Allen
Inventor
James P. Holder,
By his Attorney
Victor J. Evans

UNITED STATES PATENT OFFICE.

JAMES P. HOLDER, OF NEW YORK, N. Y.

CUSHION-WHEEL.

No. 850,000.   Specification of Letters Patent.   Patented April 9, 1907.

Application filed February 24, 1906. Serial No. 302,743.

*To all whom it may concern:*

Be it known that I, JAMES P. HOLDER, a citizen of the United States, residing at New York, in the county of New York and State of New York, have invented new and useful Improvements in Cushion-Wheels, of which the following is a specification.

My invention relates to vehicle-tires, and more particularly to that class where a cushion is interposed between the tire of the wheel and axle of the vehicle, its object being to give an easy motion to the vehicle as the wheel moves along the ground. In accomplishing this object I use two fellies in the construction of this wheel, one within the other, and between them I arrange a new and novel system of springs which take up the jolt and jar given the outer felly and its tire and leave the inner felly comparatively free from these irregular motions and prevents the transmission of same to the axle and vehicle. These and other objects and details of the invention are more fully described in the following specification and set forth in the appended claims.

In the drawings accompanying this specification and forming a part thereof like reference characters are used to designate the same parts in the various figures, and Figure 1 is a side elevation of enough of a wheel to clearly illustrate my invention. Fig. 2 is a cross-section on the line 2 2 of Fig. 1. Fig. 3 is a cross-section of a modified form of construction, and Fig. 4 is a detail of one of the spring members connecting the two fellies.

The two fellies 5 and 6 are concentric with each other, the inner one, 5, receiving the outer ends of the spokes 7 and is embraced by a metal ring 8, which is depressed at certain points 9, as shown in Fig. 4. These depressions 9 in the ring 8 are adapted to receive leaf-springs 10, made up of several sections, but preferably three, as shown in the drawings, and are held rigid with the felly 5 by means of clips 11, which are more clearly shown in Fig. 2, where they will be seen to embrace the felly and leaves of the spring 10, and their ends drawn together by means of the bolts 12. These clips are held in place and the springs 10 are also more rigidly united to the felly by means of bolts 13, which pass through the springs and felly, and whose heads 14 occupy the space between the ends of the clips 11, while the inner ends of the bolts have nuts 15, which bind these parts and the ring 8 firmly together.

The ends of the springs 10 are provided with eye-plates 16, which are secured to said ends on the inner leaf by means of clips 17, that not only bind these eye-plates to their proper place, but also add strength and rigidity to the springs. The construction of these clips 17 is more clearly shown in Fig. 4, where I have shown two forms; but it is obvious that any simple construction may be used to accomplish this end. In the left-hand clip in this figure the same is shown as constructed with three sides, two of which embrace the edges of the leaves of the springs, while the third or uniting side is held firmly against the side of the outer leaf by means of a bolt 18, which passes through said side of the clip and is provided with a sleeve of hard metal 16' (shown in dotted lines) where it passes through the middle and the outer leaf of the spring.

The lateral screws 19 pass from the sides of the clip into the eye-plate and add to the security of this attachment. In the modified form at the right-hand side of the spring 10 I show a clip 17', which embraces the leaves of the springs and the eye-plate 16, and the two outer leaves of the spring are slotted to receive the head of a bolt 18', the said head resting upon the inner leaf of the spring, passing through the eye-plate and inner side of the clip and carrying on its outer end the nut 19'. It is evident that great strength is required in the attachment which secures the eye-plate to the spring. For this reason I don't confine myself to the ordinary simple methods which might be adopted necessarily to the form shown, even stronger means may be adopted to join these parts to withstand the severe strain to which devices of this nature are submitted.

Working in conjunction with the eye-plates 16 are hinge members 20, which are perforated to receive the bolts 21, that also pass through the eyes of the plates 16 and afford a rocking means at the ends of the springs 10. This hinge member 20 has an offset at its upper end which engages a lateral socket 22 at the side of the eye-plates 16, that receives the ends of the inner leaf of the spring 10 and at the same time coöperates with said end of the hinge member to form a stop for the retractile action of the springs 10 and 31, while the outward movement of the ends of the springs is not restricted. The lower ends of these hinge members 20 are perforated to receive bolts 23, and connected with the same is a link 24, having perforated ends which receive bolts 26 and 27, that pass through the ears of plates 28 and 29, secured to shoes 30, which are carried as a felly at intervals around its circumference, as shown in Fig. 4. It is very evident that when the spring 10 is compressed the hinge member 20 yields and bends outward, accommodating the increased length of the spring, and the large bearing-surface of the shoes 30 firmly secure these parts to the outer felly and give the whole a substantial and rigid construction. The shoes 30 are flat-bottomed steel boxes having parallel sides which hug the inner edge of the felly 6 and aided by the tension of the spring 10 and 31 forming in itself a stiff but yielding ring normally circular in form in consequence of the pressure of the springs.

The bolts 21, which pass through the eyes of the plates 16 and the hinge members 20, also carry the hook ends of a coil-spring 31, which is under tension, and when the wheel is depressed at this point and the springs 10 are depressed this coil-spring 31 is also acted upon and put under greater tension, the tendency of the two springs being to return to the normal position illustrated in the drawings. As shown in Figs. 2 and 3, this spring in cross-section is not necessarily a true circle, but more oval. This enables me to employ springs whose straight portions have not had their strength nor resilient qualities injured by the convolutions of which the average spring is composed and also allows me to utilize the space provided to the greatest advantage, the said oval construction enabling me to use a spring which would fill nearly the whole of the space between the outer lines of the fellies.

When the wheel as thus shown and described is put together, it may be found desirable to inclose the same in some flexible housing in order to keep out the dirt and dust which would enter the frictional parts and grind these parts away, causing them to become loose and tending to rattle and drop apart. In order to inclose these parts, I clamp to each side of the two fellies an apron 32, of rubber, cloth, canvas, or similar durable and flexible material. For convenience of illustration this apron is not shown in Fig. 1. As shown in Fig. 2, the inner end of this apron is secured to the inner felly by means of segmental plates 33 and having screws 34 to secure them to the felly. The outer edge of this apron is clamped between the circular edge 33 of the rubber tire 34 and the side faces of the shoes or sections 30, the rubber tire having its body made up of the usual fabric, while vulcanized within near its outer surface are a number of wires 35, having inturned ends which brace and strengthen the circular edge 33.

The sections 36 of the felly 6 is of leather in order to give due protection to the rubber tire 34, and on the outer surface of the leather tire 36 are metal plates 37, encircling the whole at intervals and of about the length of its companion shoe in order to give the necessary protection which the leather and rubber could not otherwise stand, the intervening space between the plates being adapted to allow the resilient action of the leather to assert itself. These three sections 34, 36, and 37 are rigidly secured together by screws 38 and a bolt 39, the latter passing through all the sections and the other one of the shoes 28 or 29, where a nut 40 serves to bind them all together and secure the springs effectually to the tire. In Fig. 3 I show a modified form of the wheel in cross-section and in which a thin flat spring steel hoop 25 lies on the inner side of the felly and on same the shoes 30 lie. This hoop 25 is adapted to keep the flexible felly circular in form, acts as a further aid to resiliency, and maintains lateral rigidity of said felly, and yet allows the inward and outward movement of the sectional parts 30. Superimposed upon said hoop and maintained in position by the sides of the shoes or sections 30 are rings of cotton web 44 and leather rings 41, 42, and 43, and iron plates 45, one plate over each shoe 30, the whole making a firm and flexible tire impervious to moisture, mud, or grit, the parts 30, 41, 42, 43, and 44 being bolted together by the bolt 47 and its nut 48. The apron in this case has its inner edges securely attached to segmental plates 49, also secured to the inner felly 5 by screws 50; and, being of one piece, has its central portion carried between the leather sections 42 and 43, from which it can be removed by taking off the plates 45 and the two leather sections 41 and 42 and loosening the screws in the plates 49. This wheel is especially able to withstand great lateral strains and the combined resilient qualities of the springs, the leather and rubber making it an exceedingly easy running wheel, one not liable to be punctured or get out of order. In the construction of such a wheel various little modifications in the details here shown can be resorted to without departing from the broad idea which I have hereinbefore described. The middle section of the aprons 32 may be so thickened or enlarged as to form a rubber ring or tire interposed with the rings 41 44.

I claim—

1. In a vehicle-wheel, the combination with the felly carried by the spokes of a second concentric felly outside of the first and carrying the tire, a flat spring rigidly secured to the first felly and hinged to the second felly and resilient means between the ends of the flat springs.

2. In a vehicle-wheel the combination with felly carried by the spokes, of flat semi-elliptical springs secured to same, an outer concentric felly carrying the tire, segmental shoes secured to same, hinge members connecting the shoes with the ends of the flat springs and resilient means between the hinge members of each flat spring.

3. In a vehicle-wheel the combination with a tire and its felly, of a series of shoes carried by same, an inner concentric felly, flat semi-elliptical springs carried by same, hinged means between the ends of the flat springs and the shoes of the outer felly and resilient means between the ends of the flat springs.

4. In a vehicle-wheel the combination with a tire, of segmental shoes secured thereto, perforated ears on the shoes, hinge members, links connecting the ears with the hinge members, a felly concentric with the tire, semi-elliptical springs secured to the felly, eyes at the ends of same, binding means securing the eyes to the springs, pivots securing the eyes to the hinge members and a coil-spring connecting the ends of each spring.

5. In a vehicle-wheel, the combination with the felly of the wheel, a leaf-spring secured to the felly, another felly, a hinge connection between the ends of the leaf-spring and the other felly, and a coiled spring connected to the ends of the leaf-spring.

6. In a vehicle-wheel, the combination with the felly of the wheel, of a leaf-spring, a clip adapted to secure the leaf-spring to the felly, another felly, a hinge connection between the ends of the leaf-spring and the other felly, and a coiled spring connected to the ends of the leaf-spring.

7. In a vehicle-wheel, the combination with the felly of the wheel, of a leaf-spring, a clip adapted to secure the leaf-spring to the felly, eye-plates secured to the ends of the leaf-spring, members hingedly connected to the eye-plates, another felly, connection between said other felly and the members, and a coiled spring connected with the ends of the leaf-spring.

8. The combination with a vehicle-wheel, of springs secured thereto, eye-plates secured to the springs, members hingedly connected to the eye-plates, a felly, and connections between the felly and the members.

9. The combination with a vehicle-wheel, of springs secured thereto, a felly, a connection between the ends of the springs and the felly, and another spring connected to the ends of each of the first-named springs.

10. The combination with a vehicle-wheel, of springs secured thereto, a sectional felly, and hinge connections between the ends of the springs and the sections of the felly.

11. The combination with a vehicle-wheel, of springs secured thereto, a sectional felly, hinge connections between the ends of the springs and the sections of the felly, and other springs connected to the first-named springs.

In testimony whereof I have affixed my signature in presence of two witnesses.

JAMES P. HOLDER.

Witnesses:
ARTEMAS B. JOHNSTON,
SUSAN B. HOLDER.